(12) United States Patent
Giladi et al.

(10) Patent No.: US 10,270,829 B2
(45) Date of Patent: *Apr. 23, 2019

(54) SPECIFYING CLIENT BEHAVIOR AND SESSIONS IN DYNAMIC ADAPTIVE STREAMING OVER HYPERTEXT TRANSFER PROTOCOL (DASH)

(71) Applicant: Futurewei Technologies, Inc., Plano, TX (US)

(72) Inventors: Alexander Giladi, Princeton, NJ (US); Xin Wang, Rancho Palos Verdes, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,909

(22) Filed: Dec. 16, 2016

(65) Prior Publication Data

US 2017/0104803 A1    Apr. 13, 2017

Related U.S. Application Data

(63) Continuation of application No. 14/843,704, filed on Sep. 2, 2015, now Pat. No. 9,560,394, which is a
(Continued)

(51) Int. Cl.
*H04L 29/06* (2006.01)
*H04L 29/08* (2006.01)
(Continued)

(52) U.S. Cl.
CPC ............ *H04L 65/601* (2013.01); *H04L 65/00* (2013.01); *H04L 65/4084* (2013.01);
(Continued)

(58) Field of Classification Search
None
See application file for complete search history.

(56) References Cited

U.S. PATENT DOCUMENTS

| | | |
|---|---|---|
| 8,495,675 B1 | 7/2013 | Philpott et al. |
| 9,082,092 B1 | 7/2015 | Henry |

(Continued)

FOREIGN PATENT DOCUMENTS

| | | |
|---|---|---|
| CN | 102232298 A | 11/2011 |
| EP | 2733935 A1 | 5/2014 |

(Continued)

OTHER PUBLICATIONS

Iraj, Sodagar, The MPEG-DASH Standard for Multimedia Streaming Over the Internet, 2011, IEEE DASH-mm-2011.*
(Continued)

*Primary Examiner* — Hoang Vu A Nguyen Ba
(74) *Attorney, Agent, or Firm* — Conley Rose, P.C.

(57) ABSTRACT

An apparatus comprises a receiver configured to receive a request for an adaptive streaming media presentation description (MPD), a processor coupled to the receiver and configured to generate the MPD, wherein the MPD indicates an event, and wherein the event is time-related auxiliary information, and a transmitter coupled to the processor and configured to transmit the MPD. A method comprises receiving a request for an adaptive streaming media presentation description (MPD), generating the MPD, wherein the MPD indicates an event, and wherein the event is time-related auxiliary information, and transmitting the MPD. An apparatus comprises a processor configured to generate a request for an adaptive streaming media presentation description (MPD), a transmitter coupled to the processor and configured to transmit the request, and a receiver coupled to the processor and configured to receive the MPD, (Continued)

wherein the MPD indicates an event, and wherein the event is time-related auxiliary information.

20 Claims, 5 Drawing Sheets

Related U.S. Application Data continuation of application No. 14/549,474, filed on Nov. 20, 2014, now Pat. No. 9,237,364, which is a continuation of application No. 13/937,661, filed on Jul. 9, 2013, now Pat. No. 8,924,582.

(60) Provisional application No. 61/669,437, filed on Jul. 9, 2012.

(51) Int. Cl.
| | |
|---|---|
| H04N 21/81 | (2011.01) |
| H04N 21/239 | (2011.01) |
| H04N 21/262 | (2011.01) |
| H04N 21/435 | (2011.01) |
| H04N 21/647 | (2011.01) |
| H04N 21/845 | (2011.01) |
| H04N 21/2343 | (2011.01) |
| H04N 21/4402 | (2011.01) |
| H04N 21/6377 | (2011.01) |
| H04N 21/6543 | (2011.01) |

(52) U.S. Cl.
CPC .......... *H04L 65/60* (2013.01); *H04L 65/602* (2013.01); *H04L 65/604* (2013.01); *H04L 65/607* (2013.01); *H04L 65/608* (2013.01); *H04L 67/02* (2013.01); *H04L 67/108* (2013.01); *H04L 67/303* (2013.01); *H04L 67/306* (2013.01); *H04N 21/2393* (2013.01); *H04N 21/23439* (2013.01); *H04N 21/26258* (2013.01); *H04N 21/4355* (2013.01); *H04N 21/4402* (2013.01); *H04N 21/6377* (2013.01); *H04N 21/647* (2013.01); *H04N 21/6543* (2013.01); *H04N 21/812* (2013.01); *H04N 21/8456* (2013.01)

(56) References Cited

U.S. PATENT DOCUMENTS

| | | | |
|---|---|---|---|
| 9,191,151 B2 | 11/2015 | Luby et al. | |
| 9,319,448 B2 | 4/2016 | Chen et al. | |
| 9,497,290 B2 | 11/2016 | Furbeck et al. | |
| 9,712,585 B2 | 7/2017 | Lohmar et al. | |
| 9,775,163 B2* | 9/2017 | Schierl | H04W 72/08 |
| 2002/0009137 A1 | 1/2002 | Nelson et al. | |
| 2003/0005386 A1 | 1/2003 | Bhatt et al. | |
| 2004/0031054 A1 | 2/2004 | Dankworth et al. | |
| 2008/0201451 A1 | 8/2008 | Yu | |
| 2009/0183215 A1 | 7/2009 | McCartie et al. | |
| 2010/0192210 A1 | 7/2010 | Purdy, Sr. et al. | |
| 2010/0333123 A1 | 12/2010 | Mehta | |
| 2011/0099594 A1 | 4/2011 | Chen et al. | |
| 2011/0208726 A1 | 8/2011 | Shah | |
| 2011/0239078 A1 | 9/2011 | Luby et al. | |
| 2012/0042090 A1* | 2/2012 | Chen | H04L 65/607 709/231 |
| 2012/0047542 A1 | 2/2012 | Lewis et al. | |
| 2012/0090036 A1 | 4/2012 | Kang et al. | |
| 2012/0151009 A1* | 6/2012 | Bouazizi | H04L 41/5067 709/219 |
| 2012/0203867 A1 | 8/2012 | Furbeck | |
| 2012/0259994 A1 | 10/2012 | Gillies et al. | |
| 2012/0314026 A1 | 12/2012 | Chen et al. | |
| 2013/0007223 A1 | 1/2013 | Luby et al. | |
| 2013/0042100 A1 | 2/2013 | Bouazizi et al. | |
| 2013/0060911 A1 | 3/2013 | Nagaraj et al. | |
| 2013/0091297 A1* | 4/2013 | Minder | H04N 21/23439 709/231 |
| 2013/0111028 A1 | 5/2013 | Kondrad et al. | |
| 2013/0117413 A1 | 5/2013 | Kaneko et al. | |
| 2013/0182643 A1 | 7/2013 | Pazos et al. | |
| 2013/0185398 A1 | 7/2013 | Thang et al. | |
| 2013/0185756 A1 | 7/2013 | Frojdh et al. | |
| 2013/0195204 A1* | 8/2013 | Reznik | H04N 19/85 375/240.26 |
| 2013/0246643 A1 | 9/2013 | Luby et al. | |
| 2013/0268577 A1 | 10/2013 | Dyman | |
| 2013/0268761 A1 | 10/2013 | Giladi | |
| 2013/0279879 A1 | 10/2013 | Watanabe et al. | |
| 2013/0286879 A1 | 10/2013 | ElArabawy et al. | |
| 2013/0290492 A1 | 10/2013 | ElArabawy et al. | |
| 2013/0290697 A1 | 10/2013 | Wang et al. | |
| 2013/0298170 A1 | 11/2013 | ElArabawy et al. | |
| 2014/0006564 A1 | 1/2014 | Thang et al. | |
| 2014/0013003 A1 | 1/2014 | Giladi | |
| 2014/0013375 A1 | 1/2014 | Giladi | |
| 2014/0019635 A1 | 1/2014 | Reznik et al. | |
| 2014/0032777 A1 | 1/2014 | Yuan et al. | |
| 2014/0047123 A1 | 2/2014 | Oyman | |
| 2014/0101707 A1 | 4/2014 | Kishore | |
| 2014/0156800 A1 | 6/2014 | Falvo | |
| 2014/0156865 A1 | 6/2014 | Giladi | |
| 2015/0032855 A1 | 1/2015 | Wang et al. | |
| 2015/0381692 A1 | 12/2015 | Giladi et al. | |
| 2017/0006274 A1 | 1/2017 | Watanabe et al. | |

FOREIGN PATENT DOCUMENTS

| | | |
|---|---|---|
| JP | 2013021574 A | 1/2013 |
| JP | 2015517266 A | 6/2015 |
| KR | 20100116191 A | 10/2010 |
| WO | 2011087449 A1 | 7/2011 |
| WO | 2012011450 A1 | 1/2012 |
| WO | 2012019621 A1 | 2/2012 |
| WO | 2012021538 A1 | 2/2012 |
| WO | 2012096353 A1 | 7/2012 |
| WO | 2013052774 A1 | 4/2013 |

OTHER PUBLICATIONS

AskF5, K12964—Configuring HTTP form-based authentication using URL matching for BIG-IP APM, Aug. 25, 2011.*
Jan Ozer, What is MPEG DASH, Nov. 22, 2011, Streaming Media Magazine, www.streamingmedia.com.*
Oracle, About URL-Based Authentication, Jun. 9, 2016.*
Schulzrinne, H., et al,. "Real Time Streaming Protocol (RTSP)," RFC 2326, Apr. 1998, 93 pages.
Muller, C., et al., "A Test-Bed for the Dynamic Adaptive Streaming over HTTP featuring Session Mobility," MMSYS 11 Proceedings of the Second Annual ACM Conference on Multimedia Systems, XP055095585, Feb. 23, 2011, 6 pages.
Sodagar, I., et al., "The MPEG-DASH Standard for Multimedia Streaming Over the Internet," Industry and Standards, Mitsubishi Electric Research Labs, Oct.-Dec. 2011, pp. 62-67.
"Information Technology—Dynamic Adaptive Streaming Over HTTP (DASH)—Part 1: Media Presentation Description and Segment Formats," ISO/IEC 23009-1, Apr. 1, 2012, 134 pages.
"Information Technology—Dynamic Adaptive Streaming Over HTTP (DASH)—Part 1: Media Presentation Description and Segment Formats, Technical Corrigendum 1," ISO/IEC 23009-1:2012/Cor. 1:2013(E); Jun. 1, 2013, 61 pages.
"Extensible Markup Language (XML) 1.0 (Fifth Edition)," W3C Recommendation, Retrieved from URL: http://www.23.org.TR/REC-xml/, Nov. 26, 2008, 37 pages.
"Universal Mobile Telecommunications Systems (UMTS); LTE; Transparent end-to-end Packet-Switched Streaming Service (PSS); Progressive Download and Dynamic Adaptive Streaming Over HTTP (3GP-DASH) (3GPP TS 26.247 Version 10.2.0 Release 10)" ETSI TS 126 247, vol. 3GPP SA 4, No. V10.2.0, Jul. 1, 2012, 112 pages.

(56) References Cited

OTHER PUBLICATIONS

Giladi, A., et al., "Defining DASH Client Behavior," ISO/IEC JTC1/WG11 MPEG2012/M25790, Stockholm, Sweden, Jul. 2012, 4 pages.
Foreign Communication From a Counterpart Application, PCT Application No. PCT/US2013/049689, International Search Report dated Jan. 22, 2014, 5 pages.
Foreign Communication From a Counterpart Application, PCT Application No. PCT/US2013/049689, Written Opinion dated Jan. 22, 2014, 11 pages.
Foreign Communication From a Counterpart Application, European Application No. 13742319.0, European Office Action dated Jan. 5, 2016, 7 pages.
Foreign Communication From a Counterpart Application, Japanese Application No. 2015-521719, Japanese Office Action dated Feb. 23, 2016, 3 pages.
Foreign Communication From a Counterpart Application, Japanese Application No. 2015-521719, English Translation of Japanese Office Action dated Feb. 23, 2016, 4 pages.
Foreign Communication From a Counterpart Application, Korean Application No. 10-2015-7000604, Korean Notice of Allowance dated May 18, 2016, 3 pages.
Office Action dated Mar. 5, 2014, 20 pages, U.S. Appl. No. 13/937,661, filed Jul. 9, 2013.
Notice of Allowance dated Aug. 19, 2014, 9 pages, U.S. Appl. No. 13/937,661, filed Jul. 9, 2013.
Office Action dated Jun. 26, 2015, 18 pages, U.S. Appl. No. 14/549,474, filed Nov. 20, 2014.
Notice of Allowance dated Oct. 23, 2015, 5 pages, U.S. Appl. No. 14/549,474, filed Nov. 20, 2014.
Digital Program Insertion—Advertising Systems Interface, Part 10, Stream Restriction Data Model (SRDM), Society of Cable Telecommunications Engineers, Engineering Committee, Digital Video Subcommittee, SCTE 130-10 2013, 17 pages.
"Information Technology—Dynamic Adaptive Streaming Over HTTP (DASH)—Part 3: Implementation Guidelines," ISO/IEC JTC1/SC 29 N, Jan. 25, 2013, 17 pages.
Foreign Communication From a Counterpart Application, Chinese Application No. 2013800361215, Chinese Search Report dated Feb. 21, 2017, 2 pages.
Foreign Communication From a Counterpart Application, Japanese Application No. 2016-512118, Japanese Office Action dated Mar. 14, 2017, 6 pages.
Foreign Communication From a Counterpart Application, Japanese Application No. 2016-512118, English Translation of Japanese Office Action dated Mar. 14, 2017, 7 pages.
Foreign Communication From a Counterpart Application Chinese Application No. 201380036121.5, Chinese Office Action dated Mar. 3, 2017, 7 pages.
"Information technology—Dynamic adaptive streaming over HTTP (DASH)—Part 1: Media presentation description and segment Formats, Amendment 1: High Profile and Availability Time Synchronization," ISO/IEC JTC 1/SC 29, ISO/IEC 23009-1:201x/DAM 1, Apr. 4, 2014, 16 pages.
"Ad Insertion in DASH Architectures and Guidelines," Dash Industry Forum, May 9, 2014, 43 pages.
"Guidelines for Implementation: DASH-AVC/264 Interoperability Points," DASH Industry Forum, Version 1.03, Jun. 4, 2013, 37 pages.
"Information technology—Dynamic adaptive streaming over HTTP (DASH)—Part 1: Media presentation description and segments formats," International Standard, ISO/IEC 20039-1, Second Edition, 2013, 152 pages.
Convenor, "Liaison response on MPEG-DASH," ISO/IEC JTC1/SC29/WG11 N13726, Tdoc S4 (13)1278, TSG SA4#76 meeting, Nov. 4-8, 2013, 1 page.
"XML Linking Language (XLink) Version 1.1" May 6, 2010, 34 pages.
Foreign Communication From a Counterpart Application, Japanese Application No. 2016-512118, Japanese Office Action dated Nov. 22, 2016, 12 pages.
Foreign Communication From a Counterpart Application, Japanese Application No. 2016-512118, English Translation of Japanese Office Action dated Nov. 22, 2016, 13 pages.
Office Action dated Apr. 4, 2016, 29 pages, U.S. Appl. No. 14/843,704, filed Sep. 2, 2015.
Notice of Allowance dated Sep. 16, 2016, 14 pages, U.S. Appl. No. 14/843,704, filed Sep. 2, 2015.
Godart-Brown, G., et al., "Advert Insertion using MPEG DASH," Version 1.0, May 15, 2013, 42 pages.
"Information technology—Dynamic adaptive streaming over HTTP (DASH)—Part 1: Media presentation description and segment formats, Amendment 1: Support for Event Messages and extended Audio Channel Configuration," ISO/IEC JTC 1/SC 29, ISO/IEC 23009-1:2012/DAM 1, Aug. 14, 2012, 28 pages.
Giladi, A., "Enabling server-driven dynamic advanced advertising functionality," ISO/IEC JTC1/SC29/WG11 MPEG2013/m30424, Aug. 2013, 8 pages.
"Information Technology—Dynamic adaptive streaming over HTTP (DASH)—Part 3: Implementation guidelines," ISO/IEC JTC1/SC 29 N, ISO/IEC PDTR 23009-3, Jan. 25, 2013, 52 pages.
Frojdh, P, et al., "DASH MPD chema forward and backward compatibility," ISO/IEC JTC1/SC29/WG11 MPEG2013/M29319, Apr. 2013, 5 pages.
Machine Translation and Abstract of Japanese Publication No. JPA201321574, Jan. 31, 2013, 40 pages.
Machine Translation and Abstract of Japanese Publication No. JPA2015517266, Jun. 18, 2015, 21 pages.
Foreign Communication From a Counterpart Application, PCT Application No. PCT/US2014/046698, International Search Report dated Nov. 4, 2014, 4 pages.
Foreign Communication From a Counterpart Application, PCT Application No. PCT/US2014/046698, Written Opinion dated Nov. 4, 2014, 7 pages.
Office Action dated Jan. 9, 2017, 6 pages, U.S. Appl. No. 14/331,963, filed Jul. 15, 2014.
Office Action dated Feb. 16, 2017, U.S. Appl. No. 14/331,963, filed Jul. 15, 2014.
Foreign Communication From a Counterpart Application, Chinese Application No. 201480028558.9, Chinese Search Report dated Dec. 12, 2017, 2 pages.
Foreign Communication From a Counterpart Application, Chinese Application No. 201480028558.9, Chinese Office Action dated Jan. 2, 2018, 7 pages.
Office Action dated Feb. 14, 2019, U.S. Appl. No. 14/331,963, filed Jul. 15, 2014.

* cited by examiner

SPECIFYING CLIENT BEHAVIOR AND SESSIONS IN DYNAMIC ADAPTIVE STREAMING OVER HYPERTEXT TRANSFER PROTOCOL (DASH)

CROSS-REFERENCE TO RELATED APPLICATIONS

This application is a continuation application of U.S. patent application Ser. No. 14/843,704 filed on Sep. 2, 2015 by Futurewei Technologies, Inc. and titled "Specifying Client Behavior and Sessions in Dynamic Adaptive Streaming over Hypertext Transfer Protocol (DASH)," which is a continuation application of U.S. patent application Ser. No. 14/549,474 filed Nov. 20, 2014 by Futurewei Technologies, Inc. and titled "Specifying Client Behavior and Sessions in Dynamic Adaptive Streaming over Hypertext Transfer Protocol (DASH)," now U.S. Pat. No. 9,237,364, which is a continuation application of U.S. patent application Ser. No. 13/937,661 filed Jul. 9, 2013 by Futurewei Technologies, Inc. and titled "Specifying Client Behavior and Sessions in Dynamic Adaptive Streaming over Hypertext Transfer Protocol (DASH)," now U.S. Pat. No. 8,924,582, which claims priority to U.S. provisional application No. 61/669,437 filed Jul. 9, 2012 by Alexander Giladi and titled "DASH Client Behavior Framework and Implementation of Session Management," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many television and movie viewers now desire on-demand access to video and other media content. As a first example, a television viewer may desire to watch a television show that he or she missed during the show's regular air time on television. The viewer may download the show on demand over the Internet via a web browser or other application on a notebook computer, tablet computer, desktop computer, mobile telephone, or other device, then view that show in the browser or other application. As a second example, a viewer may download a movie on demand. As a third example, a viewer may participate in a videoconference with other viewers.

Dynamic Adaptive Streaming over Hypertext Transfer Protocol (DASH) is a standard developed to provide such media content and is partially described in International Organization for Standardization (ISO)/International Electrotechnical Commission (IEC) 23009-1, First Edition, 2012 ("23009-1"), which is incorporated in its entirety. In addition, ISO/IEC 23009-1, Technical Corrigendum 1, 2013 is incorporated in its entirety. In DASH, there are two main devices: the Hypertext Transfer Protocol (HTTP) server or servers that provide the content and the DASH client that downloads the content and is associated with the viewer, or user. DASH leaves control with the client, which can request content using the HTTP protocol. DASH is dynamic and adaptive because the client may choose from among multiple forms of content, or data, based on a variety of factors such as network conditions, device capability, and user choice. For example, the HTTP server may inform the client of different download bit rates, the client may choose one of the bit rates, and the client may begin downloading segments of data at the chosen bit rate. If for some reason network conditions deteriorate, then the client may change to a lower bit rate and begin downloading segments of data at the new bit rate. DASH's adaptability therefore ensures that the client consumes less than the available bandwidth.

The television show, movie, video conference, or other media content that the client desires to view may be referred to as the main content. The provider of the main content may desire to earn revenue for providing the main content. One way to earn revenue is to include advertisements with the main content. The advertisements may be referred to as ads or ad content. Accordingly, the HTTP server may direct the client to download ads from an ad server. The client may not be able to download or display the main content or portions of the main content until it downloads and displays the ad content. Furthermore, certain restrictions may be placed on the browser or other application that the content is viewed through so that the ad content cannot be skipped while viewing. Once the client downloads and views the ads, then the provider of the ad content may pay the provider of the main content.

SUMMARY

In one embodiment, the disclosure includes an apparatus comprising a receiver configured to receive a request for an adaptive streaming media presentation description (MPD), a processor coupled to the receiver and configured to generate the MPD, wherein the MPD indicates an event, and wherein the event is time-related auxiliary information, and a transmitter coupled to the processor and configured to transmit the MPD.

In another embodiment, the disclosure includes a method comprising receiving a request for an adaptive streaming MPD, generating the MPD, wherein the MPD indicates an event, and wherein the event is time-related auxiliary information, and transmitting the MPD.

In yet another embodiment, the disclosure includes an apparatus comprising a processor configured to generate a request for an adaptive streaming MPD, a transmitter coupled to the processor and configured to transmit the request, and a receiver coupled to the processor and configured to receive the MPD, wherein the MPD indicates an event, and wherein the event is time-related auxiliary information.

In yet another embodiment, the disclosure includes a method comprising generating a request for an adaptive streaming MPD, transmitting the request, and receiving the MPD, wherein the MPD indicates an event, and wherein the event is time-related auxiliary information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
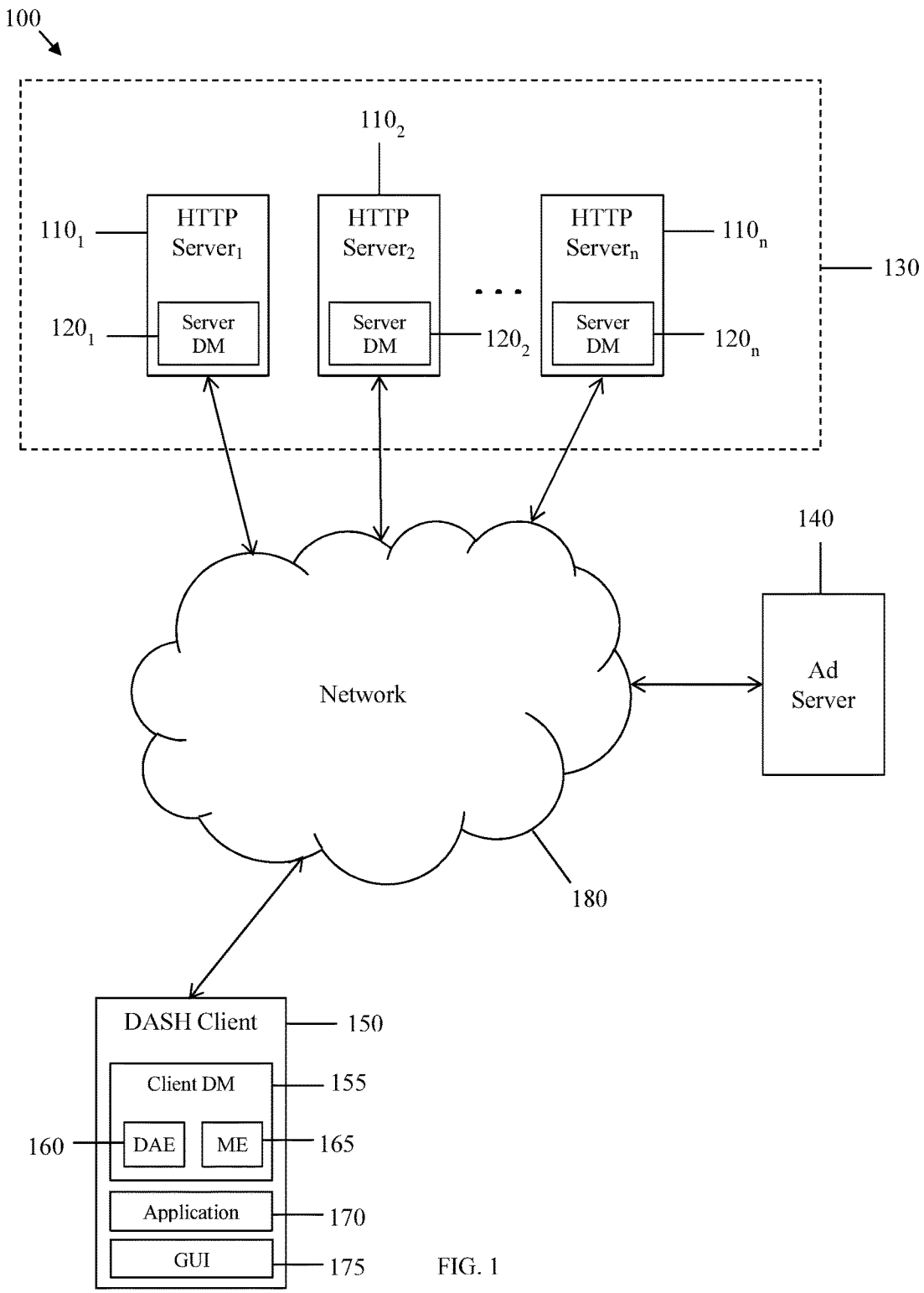
FIG. 1 is a schematic diagram of a DASH system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There are at least two problems with the design of DASH. First, DASH defines the interface between the HTTP server and the client, but it does not directly define client behavior. In order to implement interoperable clients, DASH may need to specify some client behavior. Some of that specified behavior may be related to ad insertion and some may be related to restrictions on downloading and viewing content imposed by the HTTP server or the provider of the content. Second, HTTP is a stateless protocol, meaning that it treats each request for data as an independent transaction unrelated to any previous request. HTTP therefore does not have a concept of sessions, which may refer in this disclosure to a continuous or non-continuous downloading, presenting, or viewing of a media presentation by the same user. For example, a session may comprise a user associated with a first client such as a tablet computer viewing part of a media presentation on the tablet computer, stopping viewing on the tablet computer, and resuming viewing on a second client such as a notebook computer. As a result of HTTP's statelessness and lack of a concept of sessions, an HTTP server cannot directly know which client downloaded which content. Rather, the HTTP server knows only which content is requested and downloaded. Furthermore, if the client is downloading from multiple HTTP servers, then the client knows only which HTTP server it is downloading from. Statefulness, however, may be desired in some instances. For example, the HTTP server or ad server may desire to know which client is involved in a session in order to obtain information about the client and provide targeted ads to the client. In addition, the HTTP server may desire to correlate requests for content with ratings of that content. The ads and ratings may broaden content monetization possibilities.

Disclosed herein are systems and methods for improved DASH implementation. The disclosed technique may provide for a mechanism for specifying client behavior through client descriptors and identifying sessions. The disclosed technique may therefore address each of the issues above. The disclosed technique may also apply to other standards and be implemented by other standards developing organizations (SDOs). In other words, the disclosed technique is not limited to 23009-1 or even to other DASH standards. Furthermore, the disclosed technique is not limited to video on demand or videoconferencing, but may apply to other forms of media content as well.

FIG. 1 is a schematic diagram of a DASH system 100 according to an embodiment of the disclosure. The system 100 may comprise a plurality of (e.g., n) HTTP servers 110, an ad server 140, a DASH client 150, and a network 180. The HTTP servers 110, ad server 140, and client 150 may be communicatively coupled to each other via the network 180 and other network components such as HTTP caches (not shown).

The HTTP servers 110 may be any hardware computer servers configured to send and receive data via HTTP. The HTTP servers 110 may comprise server DASH modules (DMs) 120 configured to send and receive data via HTTP and according to the DASH standard. The HTTP servers 110 may form a content delivery network (CDN) 130, which may refer to a distributed system of servers deployed in multiple data centers over multiple backbones for the purpose of delivering content. The CDN 130 may comprise any number of HTTP servers 110 so that n may be any number. Typically, a CDN may comprise thousands of servers.

The ad server 140 may be any hardware computer server configured to send and receive data via HTTP. In particular, the ad server 140 may receive requests for ads and send the requested ads to other network components. There may be any number of ad servers 140 across the system 100. If there are multiple ad servers 140, then the ad servers 140 may or may not be associated with each other.

The client 150 may be any hardware device configured to send and receive data via HTTP. For example, the client 150 may be a notebook computer, a tablet computer, a desktop computer, a mobile telephone, or another device. The client 150 may comprise a client DM 155, an application 170, and a graphical user interface (GUI) 175.

The client DM 155 may be configured to send and receive data via HTTP and according to the DASH standard. The client DM 155 may comprise a DASH access engine (DAE) 160 and a media engine (ME) 165. The DAE 160 may be the primary component for receiving raw data from the HTTP servers 110 and constructing that data in a format for viewing. For example, the DAE 160 may format the data in Moving Picture Experts Group (MPEG) container formats along with timing data, then output the formatted data to the ME 165. The ME 165 may be responsible for initialization, playback, and other functions associated with content and may output that content to the application 170.

The application 170 may be a web browser or other application with an interface configured to download and present content. The application 170 may be coupled to the GUI 175 so that a user associated with the client 150 may view the various functions of the application 170. The application 170 may comprise a search function so that the user can search for content. For example, if the application 170 is a media player, then the application 170 may comprise a search bar so that the user may input a string of words to search for a movie. The application 170 may present a list of search hits, and the user may select the desired movie from among the hits. Upon selection, the application 170 may send instructions to the client DM 155 for downloading the movie. The client DM 155 may download the movie and process the movie for outputting to the application 170. The application 170 may provide instructions to the GUI 175 for the GUI 175 to display the movie for viewing by the user. The application 170 may further provide instructions to the GUI 175 for the GUI 175 to display a progress bar showing the temporal progress of the movie.

The GUI 175 may be any GUI configured to display functions of the application 170 so that the user may operate the application. As described above, the GUI 175 may display the various functions of the application 170 so that the user may select content to download. The GUI 175 may then display the content for viewing by the user.

The network 180 may be any network configured to provide for communication among the HTTP servers 110, ad server 140, and client 150. For example, the network 180 may be the Internet, a mobile telephone network, or another network. The network 180 may allow communication along wired or wireless channels.

Figure 2:
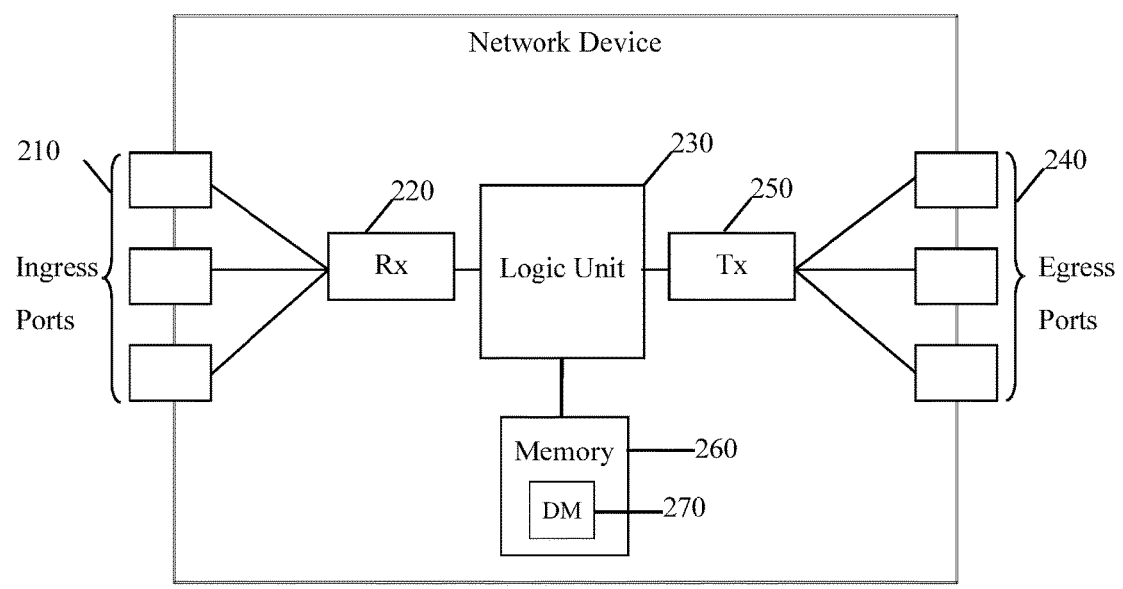
FIG. 2 is a schematic diagram of a network device according to an embodiment of the disclosure.

FIG. 2 is a schematic diagram of a network device 200 according to an embodiment of the disclosure. The device 200 may comprise a plurality of ingress ports 210 and/or receiver units (Rx) 220 for receiving data, a logic unit or processor 230 to process signals, a plurality of egress ports 240 and/or transmitter units (Tx) 250 for transmitting data to other components, and a memory 260. The device 200 may be suitable for implementing any of the disclosed features, methods, and devices. For example, the device 200 may be suitable for implementing the HTTP servers 110, the ad server 140, and the client 150.

The logic unit 230, which may be referred to as a central processing unit (CPU), may be in communication with the ingress ports 210, receiver units 220, egress ports 240, transmitter units 250, and memory 260. The logic unit 230 may be implemented as one or more CPU chips, cores (e.g., as a multi-core processor), field-programmable gate arrays (FPGAs), application specific integrated circuits (ASICs), and/or digital signal processors (DSPs), and/or may be part of one or more ASICs.

The memory 260 may be comprised of one or more disks, tape drives, optical disc drives, or solid-state drives; may be used for non-volatile storage of data and as an over-flow data storage device; may be used to store programs when such programs are selected for execution; and may be used to store instructions and data that are read during program execution. The memory 260 may be volatile and/or non-volatile and may be read-only memory (ROM), random-access memory (RAM), ternary content-addressable memory (TCAM), static random-access memory (SRAM), another suitable type of memory, or any combination thereof. The memory 260 may comprise a DM 270, which may be suitable for implementing the server DMs 120 or the client DM 155. While the memory 260 is shown as comprising the DM 270, the logic unit 230 or any combination of the logic unit 230 and the memory 260 may alternatively comprise the DM 270.

Figure 3:
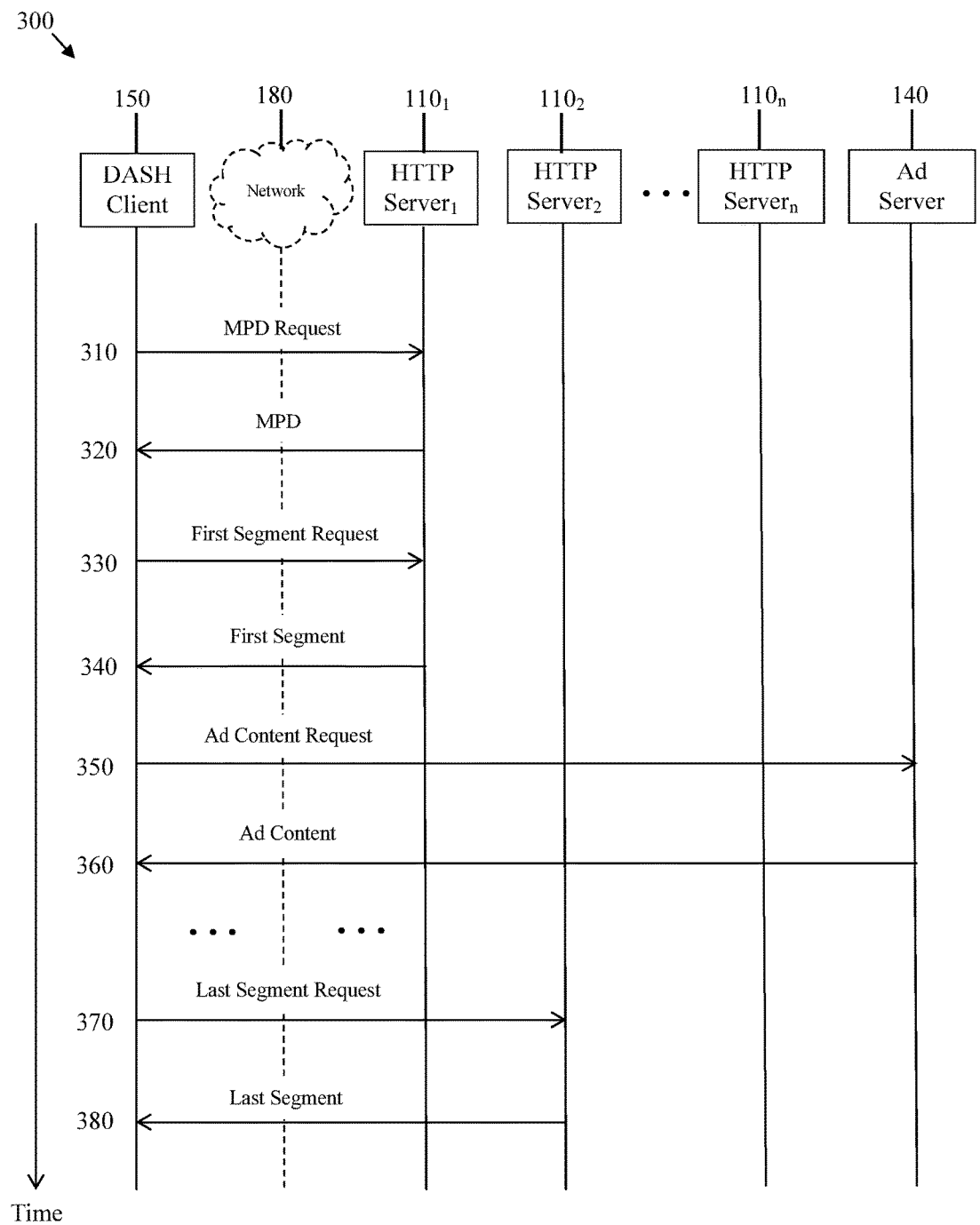
FIG. 3 is a protocol diagram for the DASH system according to an embodiment of the disclosure.

FIG. 3 is a protocol diagram 300 for the DASH system 100 according to an embodiment of the disclosure. The client 150 may desire to download main content. In that case, at step 310, the client 150 may send, or transmit or upload, to the HTTP server$_1$ 110$_1$ a request for an MPD, which may comprise instructions for downloading, or receiving, segments of the main content from any combination of HTTP servers 110. In addition to instructions for downloading segments of the main content, the MPD may require, and comprise instructions for, downloading segments of ad content from the ad server 140. MPDs are described more fully below. At step 320, the HTTP server$_1$ 110$_1$ may send to the client 150 an MPD. The client 150 may receive the MPD via the DAE 160, and the DAE 160 may process the MPD in order to construct and issue requests from the HTTP servers 110 for segments of the main content and ad content.

At step 330, as instructed by the MPD, the client 150 may send to the HTTP server$_1$ 110$_1$ via the DAE 160 a first segment request for a first segment of the main content. At step 340, the HTTP server$_1$ 110$_1$ may send to the client 150 via the server DM 120 the first segment of the main content.

The DAE 160 may receive, process, and format the first segment, then output the formatted data to the ME 165, which may perform various functions and output the data to the application 170. After a buffering period, the application 170 may present the data for viewing via the GUI 175.

At step 350, as instructed by the MPD, the client 150 may send to the ad server 140 via the DAE 160 an ad content request. At step 360, the ad server 140 may send to the client 150 the ad content. The MPD may require that the client 150 download and present the ad content before the client 150 proceeds with downloading additional segments of the main content.

Subsequently, as instructed by the MPD, the client 150 may send requests for, and receive, additional segments of the main content as well as ad content until, at step 370, the client 150 may send to the HTTP server$_2$ 110$_2$ via the DAE 160 a last segment request for a last segment of the main content. Finally, at step 380, the HTTP server$_2$ 110$_2$ may send to the client 150 via the server DM 120 the last segment of the main content. After receiving each segment, the DAE 160 may process and format that segment, then output the formatted data to the ME 165. The ME 165 may perform various functions and output the data to the application 170. After a buffering period, the application 170 may present the data for viewing via the GUI 175.

The main content and ad content may be downloaded in any order as instructed by the MPD. The client 150 may download content while simultaneously displaying the content for viewing. The simultaneous downloading and displaying may be why the process is referred to as streaming. The process of requesting and receiving the MPD may be reiterative. For example, the client 150 may request, or be instructed to request, an updated MPD for a variety of reasons.

Figure 4:
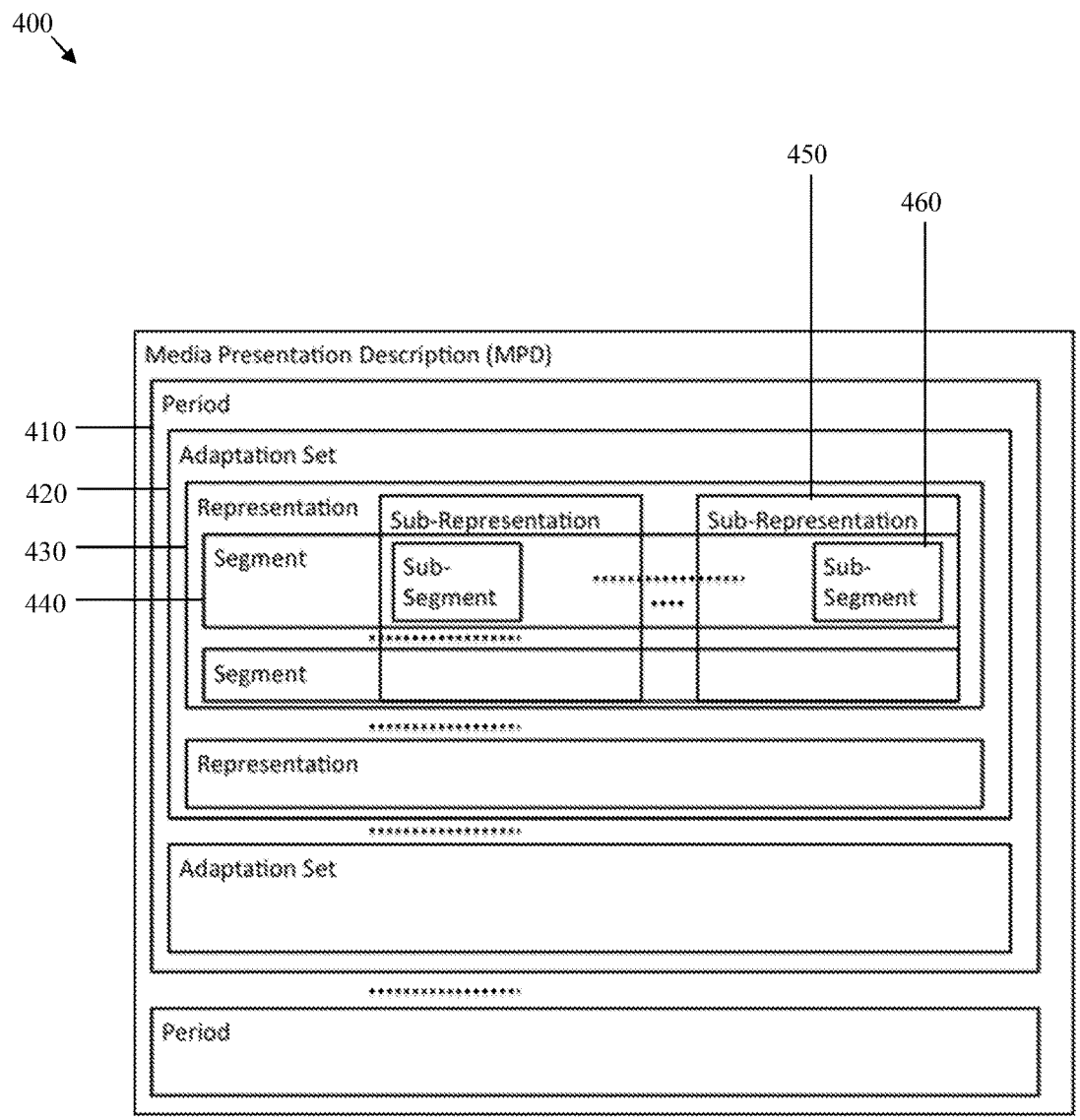
FIG. 4 is a schematic diagram of an MPD according to an embodiment of the disclosure.

FIG. 4 is a schematic diagram of an MPD 400 according to an embodiment of the disclosure. The MPD 400 may comprise Period 410, Adaptation Set 420, Representation 430, Segment 440, Sub-Representation 450, and Sub-Segment 460 elements. The elements may be distinguished by uppercase first letters or camel-casing, as well as bold face, though bold face is removed herein. For example, the Segment 440 may be an element of the MPD 400 that is associated with a segment, the latter of which may be a unit of data as described more fully below. Similarly, the Period 410 may be associated with a period of data. In 23009-1, the MPD 400 may be referred to as a "formalized description for a [m]edia [p]resentation for the purpose of providing a streaming service." A media presentation, in turn, may be referred to as a "collection of data that establishes a . . . presentation of media content." In particular, the MPD 400 may define formats to announce HTTP uniform resource locators (URLs), or network addresses, for downloading segments of data. A segment may be referred to as a unit of data associated with a URL. In other words, a segment may generally be the largest unit of data that can be retrieved with a single HTTP request using a single URL. The MPD 400 may be an Extensible Markup Language (XML) document.

In short, the MPD 400 may comprise a plurality of URLs, or metadata used by the client 150 to construct a plurality of URLs, pointing to one or more HTTP servers 110 for downloading segments of data. For example, referring to FIG. 3, the client 150 may receive a plurality of URLs in the MPD at step 320. A first URL may be associated with the first segment and point to the HTTP server$_1$ 110$_1$ so that the client 150 requests and receives the first segment from the HTTP server$_1$ 110$_1$. A second URL may be associated with the ad content and point to the ad server 140 so that the client 150 requests and receives the ad content from the ad server 140. The process may continue until the client 150 requests and receives content from the HTTP server 110 associated with the last URL.

Referring back to FIG. 4, it can be seen that the MPD 400 is a hierarchical data model. In 23009-1, the Period 410 may typically represent "a media content period during which a consistent set of encoded versions of the media content is available." In other words, the "set of available bitrates, languages, captions, subtitles, etc. does not change during a [p]eriod." The Representation 430 may describe "a deliverable encoded version of one or several media content components." The client 150 "may switch from Representation to Representation . . . in order to adapt to network conditions or other factors." The adaptability of DASH therefore lies among a set of mutually interchangeable Representations 430, which may be referred to as the Adaptation Set 420. The client 150 may determine if it can support a specific Representation 430. If not, then the client 150 may select a different Representation 430 that it can support. The client 150 may then begin downloading each segment within the selected Representation until the client 150 ceases downloading or until the client 150 selects another Representation 430.

The Period 410, Adaptation Set 420, Representation 430, Segment 440, Sub-Representation 450, and Sub-Segment 460 elements describe data. Each element may comprise one or more attributes, which are like properties of the element in that they provide further definition about the element. Elements and attributes are defined in XML 1.0, Fifth Edition, 2008, which is incorporated in its entirety. Attributes may be distinguished by a preceding @ symbol. For example, the Period 410 may comprise an @start attribute that may specify when on a presentation timeline a period associated with the Period 410 begins. The Segment 440, Sub-Representation 450, and Sub-Segment 460 elements are described in 23009-1 and do not need further explanation herein.

As described above, DASH does not directly specify client 150 behavior. DASH may, however, condition the client's 150 ability to download data on the client's 150 support of specific features. For example, if a Representation 430 comprises a ContentProtection descriptor, then DASH may not allow the client 150 to download segments associated with the Representation 430 unless the client 150 supports at least one of the schemes defined in the ContentProtection descriptor. A descriptor may refer to a data structure that has content and a unique scheme identifier identifying the content. A descriptor may be a type of element. DASH describes three types of descriptors. First, an essential, or required, descriptor in a Representation 430 may require that the client 150 support the descriptor in order to download segments associated with the Representation 430. Second, a group of descriptors in a Representation 430 may require that the client 150 support only one of the descriptors in the group in order to download segments associated with the Representation 430. Third, an informational, or optional, descriptor in a Representation 430 may not require that the client 150 support something, but may instead simply provide information about the content associated with the Representation 430. For example, a rating informational descriptor may provide a rating to the client 150 so that the client 150 may display the rating and determine for itself, for instance through parental controls, whether or not to download or display segments associated with the Representation 430.

The disclosed technique may therefore comprise a general framework for specifying client behavior. The disclosed technique may further comprise new session, event, generic, and URL authentication descriptors using the general framework. The general framework and the new descriptors may be at the Period 410, Adaptation Set 420, Representation 430, or Sub-Representation 450 level. The general framework may specify client 150 behavior and may do so for required, group, and optional contexts.

In a first embodiment, the general framework may comprise a new ClientDescriptor descriptor inherited from the abstract DescriptorType descriptor with the attributes shown in Table 1.

TABLE 1

ClientDescriptor descriptor and corresponding attributes

| Element or Attribute Name ClientDescriptor | Use | Description |
| --- | --- | --- |
| @schemeIdUri | M | Specifies a URI to identify the scheme. The semantics of this element are specific to the scheme specified by this attribute. The @schemeIdUri may be a URN or URL. When a URL is used, it should also contain a month-date in the form mmyyyy; the assignment of the URL must have been authorized by the owner of the domain name in that URL on or very close to that date, to avoid problems when domain names change ownership. |
| @groupId | CM | Specifies the ID of the group to which the descriptor belongs. Appears if and only if the @behaviour attribute value is "group." |
| @behaviour | OD | Specifies the client behaviour when encountering this descriptor. "Required" indicates that the client must support the scheme indicated by @schemeIdUri. "Group" indicates that this descriptor belongs to a group, and its behaviour is specified in the ClientDescriptorGroup element with ID given by @groupId. "Optional" is the default and specifies information that will assist the client, but does not mandate client behaviour. |
| @value | O | Specifies the value for the descriptor element. The value space and semantics must be defined by the owners of the scheme identified in the @schemeIdUri attribute. |

Legend:
For attributes: M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

In Table 1, the @schemeIdUri attribute and the @value attribute may be similar to those provided in 23009-1. In addition, the general framework may comprise a ClientDescriptorGroup descriptor inherited from the DescriptorType descriptor with the attributes shown in Table 2.

TABLE 2

ClientDescriptorGroup descriptor and corresponding attributes

| Element or Attribute Name ClientDescriptorGroup | Use | Description |
| --- | --- | --- |
| @id | M | Specifies the ID of the group. At least one of client descriptors belonging to this group is mandatory. |

TABLE 2-continued

ClientDescriptorGroup descriptor and corresponding attributes

| Element or Attribute Name ClientDescriptorGroup | Use | Description |
|---|---|---|
| @behaviour | OD | Options: "all", "any," and "optional." "Any" is the default value |

Legend:
For attributes:
M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

In a second embodiment, the general framework may not comprise a new ClientDescriptor descriptor, but may instead comprise an @id attribute for the DescriptorType descriptor as shown in Table 3.

TABLE 3

DescriptorType descriptor and corresponding attributes

| Element or Attribute Name DescriptorType | Use | Description |
|---|---|---|
| @schemeIdUri | M | Specifies a URI to identify the scheme. The semantics of this element are specific to the scheme specified by this attribute. The @schemeIdUri may be a URN or URL. When a URL is used, it should also contain a month-date in the form mmyyyy; the assignment of the URL must have been authorized by the owner of the domain name in that URL on or very close to that date, to avoid problems when domain names change ownership. |
| @value | O | Specifies the value for the descriptor element. The value space and semantics must be defined by the owners of the scheme identified in the @schemeIdUri attribute. |
| @id | O | Specifies an identifier for the descriptor. Descriptors with identical values for this attribute shall be synonymous, i.e., the processing of one of the descriptors with an identical value is sufficient. |

Legend:
For attributes: M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

In Table 3, the @id attribute may be similar to the @groupId attribute in Table 1, and the @schemeIdUri attribute and the @value attribute may be similar to those provided in 23009-1. In addition, the general framework may comprise an EssentialProperty descriptor and a SupplementalProperty descriptor. The EssentialProperty descriptor may specify information about the containing element that is considered essential by the media presentation author for processing the containing element. At least one EssentialProperty descriptor of each distinct @id value may be expected to be processed. The EssentialProperty descriptor may therefore correspond to the required value of the @behaviour attribute in Table 1. The SupplementalProperty descriptor may specify supplemental information about the containing element that may be used by the DASH client optimizing the processing. The SupplementalProperty descriptor may therefore correspond to the optional value of the @behaviour attribute in Table 1.

The session descriptor may identify a session. By identifying a session, the HTTP server 110 may be able to determine what data was downloaded, when that data was downloaded, and which client downloaded that data. In so doing, as described above, the HTTP server 110 or ad server 140 may provide targeted ads to the client, and the HTTP server may correlate requests for content with ratings of that content. In addition, identifying a session may provide for authentication and entitlements (e.g., whether a user associated with the client 150 bought, rented, or obtained a correct subscription level to view content), which are described more fully below. The session descriptor may provide for either statically or dynamically embedding session identifiers (IDs) into segment URLs. As a first example, the HTTP server 110 may insert a session ID into the MPD 400, and the client 150 may embed that session ID into segment URLs. Because the session ID remains the same, the session ID embedding may be said to be static. As a second example, the HTTP server 110 may insert a session ID URL into the MPD 400, and the client 150 may request the session ID from the HTTP server 110 associated with that URL. Because the session ID may be different each time the client 150 requests the session ID from the HTTP server 110 associated with that URL, the session ID embedding may be said to be dynamic. Dynamic embedding may be particularly suited for when the client 150 uses the same MPD 400 multiple times. The resulting session ID may become a $SessionID$ substitution variable and may be used in templates.

In a first embodiment, the session descriptor may comprise a new SessionDescriptor descriptor inherited from the ClientDescriptor descriptor and thus inherited from the DescriptorType descriptor. The SessionDescriptor descriptor may comprise the attributes shown in Table 4.

TABLE 4

SessionDescriptor descriptor and corresponding attributes

| Element or Attribute Name SessionDescriptor | Use | Description |
|---|---|---|
| @sessionID | CM | Session identifier. A string representing a 128-bit to 512-bit integer in hexadecima big-endian form. Mandatory if and only if @sessionIdUrl is not present. If present, is valid as long as the MPD is valid. |
| @sessionIdUrl | CM | URL from which will return a session ID in the format described in @sessionID above. New sessionIdUrl needs to be requested every time the client intends to start playing any segment with Segment Number 1. |
| @sessionDuration | O | Time window between the moment Session ID was received until it needs to be requested again. If absent, Session ID is always available. |
| @sessionReleaseUrl | O | URL for notifying the server that the client is leaving the session. |
| @sessionReleaseParameterName | O | Name of the query parameter carrying the Session ID It will be the last parameter of the query string (or the only parameter if query string is not present). |

Legend:
For attributes: M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

In a second embodiment, the session descriptor may comprise another way to identify a session. The session descriptor may comprise a new, inherited or non-inherited element, descriptor, or other data structure suitable for identifying a session. The session descriptor may comprise attributes for further identifying a session.

The event descriptor may identify an event. An event may be referred to as a method to signal time-related auxiliary information to the client 150 or to the application 170. For example, an event may be an ad that displays on the client 150 while main content is displaying. In that respect, the ad content may be auxiliary to the main content. An event stream may be referred to as a sequence of events with the same context. For example, a sequence of separate ads may display on the client 150 while main content is displaying. The main purpose of events may be to provide ad insertion. An event descriptor may therefore prevent downloading or displaying main content until the event described in the event descriptor, for instance an ad, is fulfilled. The details of the event descriptor may be defined by any author, for instance the HTTP server 110 or the ad server 140.

In a first embodiment, the event descriptor may comprise a new EventDescriptor descriptor inherited from the ClientDescriptor descriptor and thus inherited from the DescriptorType descriptor. The EventDescriptor descriptor may describe an event, for instance a messaging scheme. The EventDescriptor descriptor may comprise the attributes shown in Table 1. The @behaviour attribute may be used to indicate whether or not support for the described messaging scheme is required, and the @value attribute may be empty. For example, a scheme may be urn:mpeg:dash:client:mpd-update. If the client 150 supports the scheme, then the client 150 may be required to request and download a second, updated MPD 400 upon receiving an MPD 400 update message or at some subsequent time such as expiration of a first MPD 400.

In a second embodiment, the event descriptor may comprise another way to identify an event. The event descriptor may comprise a new, inherited or non-inherited element, descriptor, or other data structure suitable for identifying an event. The event descriptor may comprise attributes for further identifying an event.

The generic descriptor may be a descriptor whose name is associated with a scheme. The generic descriptor may be defined by the client 150 or a user associated with the client 150. Alternatively, the generic descriptor may be defined by another network 180 component such as the HTTP server 110.

In a first embodiment, the generic descriptor may comprise a new generic descriptor inherited from the ClientDescriptor descriptor and thus inherited from the DescriptorType descriptor. The generic descriptor may comprise the attributes shown in Table 1. The generic descriptor's behavior may be defined by the @groupId attribute and the @behaviour attribute. In addition, the generic descriptor may comprise an additional attribute to allow the client 150 to define its type.

In a second embodiment, the generic descriptor may comprise another way for the client 150 to define its type. The generic descriptor may comprise a new, inherited or non-inherited element, descriptor, or other data structure suitable for the client 150 to define its type. For example, the generic descriptor may be implemented using the EssentialProperty descriptor and the SupplementalProperty descriptor. The generic descriptor may comprise attributes for the client 150 to further define its type.

The URL authentication descriptor may provide URL authentication. URL authentication is a technique that can provide at least five advantages in the DASH context. First, the HTTP server 110 may verify a request before uploading data associated with a URL. Second, a URL may be made valid for a specified period of time. Third, a URL may have access restricted to specified geographical regions. Fourth, the HTTP server 110 may recognize a URL signature associated with the client 150 and restrict access to main content if the client 150 is downloading ad content. Fifth, the HTTP server 110 may recognize a URL signature associated with the client 150, determine when the client 150 has completed a session, and allow logging and billing for the session.

URL authentication may comprise the following five steps. First, the client 150 may download an authentication key and a URL. The URL may be, for instance, "www.cdn1.example.com/movie/256K/seg00001.ts." Second, using the authentication key, the client 150 may compute a signature, for instance a keyed-hash message authentication code (HMAC) SHA-1 signature, for the URL. Third, the client 150 may append the signature to the URL to create a signed URL. The signed URL may be, for instance, "http://cdn1.example.com/seg 00001.ts?seg=198d6c52a8755d77da7239ea0c753a7f7870 d0e0." Fourth, the client 150 may send to the HTTP server 110 a request for the data associated using the signed URL. Fifth, if the HTTP server 110 validates the signed URL, then the HTTP server 110 may upload the data associated with the signed URL; if the HTTP server 110 invalidates the signed URL, then the HTTP server 110 may discard the request or upload an error message. The authentication key may expire after a specified time. If URL authentication is used for session management, then it may be desired to terminate a session at a time convenient for the client 150 to, for instance, limit sharing of content to a specified number of devices.

In a first embodiment, the URL authentication descriptor may comprise a new UrlAuthentication descriptor inherited from the ClientDescriptor descriptor and thus inherited from the DescriptorType descriptor. The UrlAuthentication descriptor may comprise the attributes shown in Table 5.

TABLE 5

UrlAuthentication descriptor and corresponding attributes

| Element or Attribute Name UrlAuthentication | Use | Description |
| --- | --- | --- |
| @keyUrl | O | Specifies the URL for key derivation. |
| @key | O | URL authentication key as a hexadecimal big-endian number. If present, @keyUrl and @duration may not be present. |
| @duration | O | Duration of the URL authentication key validity. Can be present only if @keyUrlTemplate is present in this element. If not present, URL authentication key never expires. |
| @algorithm | M | Signature algorithm URN (currently defined only for HMAC-SHA1). |
| @parameterName | M | Name of the query parameter carrying the URL signature. It will be the last parameter of the query string (or the only parameter, if query string is not present). |

Legend:
For attributes: M = Mandatory; O = Optional; OD = Optional with Default Value; CM = Conditionally Mandatory.
For elements: <minOccurs> ... <maxOccurs> (N = unbounded).
Elements have uppercase first letters or camel-casing; attributes have a preceding @ symbol.

An example UrlAuthentication descriptor in an MPD 400 may be as follows:

```
<UrlAuthentication
    algorithm="urn:mpeg:dash:sea:hmac-sha1"
    key="33FD3F35CD966"
    parameterName="sig" />.
```

In a second embodiment, the URL authentication descriptor may comprise another way to provide URL authentication. The URL authentication descriptor may comprise a new, inherited or non-inherited element, descriptor, or other data structure suitable for providing URL authentication. For example, the URL authentication descriptor may be implemented using the EssentialProperty descriptor and the SupplementalProperty descriptor. The URL authentication descriptor may comprise attributes for further providing URL authentication.

Figure 5:
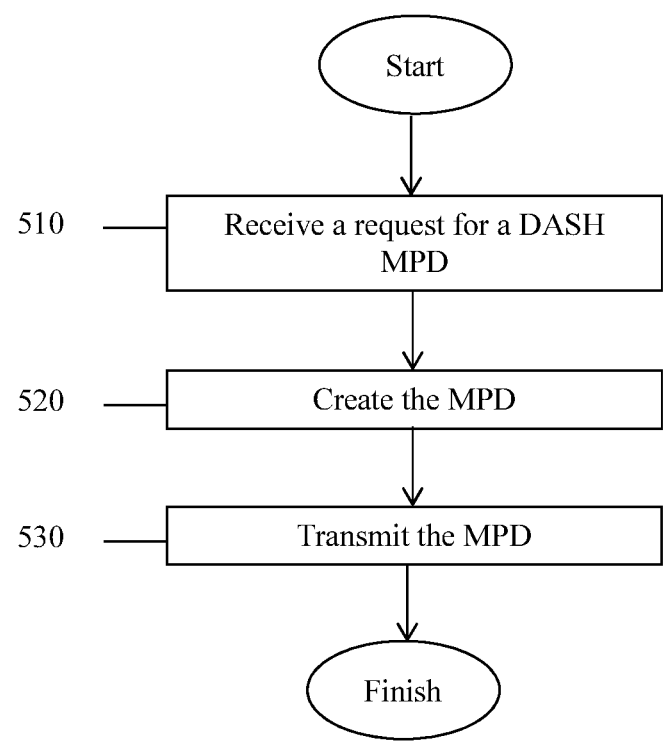
FIG. 5 is a flowchart illustrating a method according to an embodiment of the disclosure.

FIG. 5 is a flowchart illustrating a method 500 according to an embodiment of the disclosure. The method 500 may be implemented, for instance, in the client 150. At step 510, a request for a DASH MPD may be received. For example, the HTTP server 110 may receive the request from the client 150. The DASH MPD may be the MPD 400. At step 520, the MPD may be created. For example, the HTTP server 110 may create the MPD 400. The MPD 400 may comprise a mechanism for specifying client 150 behavior. The mechanism may condition the client's 150 ability to download content on the client's 150 ability to support a feature. At step 530, the MPD may be transmitted. For example, the HTTP server 110 may transmit the MPD 400 to the client 150.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a receiver configured to receive a request for a Dynamic Adaptive Streaming over Hypertext Transfer Protocol (DASH) media presentation description (MPD);
   a processor coupled to the receiver and configured to create the MPD, wherein the MPD comprises a mechanism for specifying a client's behavior, the mechanism conditions the client's ability to download content on the client's ability to support a feature, and the mechanism provides uniform resource locator (URL) authentication that restricts access to main content if the client is downloading ad content; and
   a transmitter coupled to the processor and configured to transmit the MPD.

2. The apparatus of claim 1, wherein the mechanism comprises at least one of an identifier (ID) attribute for a descriptor type descriptor, an essential property descriptor, and a supplemental property descriptor.

3. The apparatus of claim 2, wherein the ID attribute specifies an identifier for the descriptor, and wherein descriptors with identical ID attributes are synonymous.

4. The apparatus of claim 2, wherein the essential property descriptor specifies information about a containing element that is considered essential by a media presentation author for processing the containing element.

5. The apparatus of claim 2, wherein the supplemental property descriptor specifies supplemental information about a containing element that may be used by the client optimizing a processing.

6. The apparatus of claim 1, wherein the mechanism identifies a session.

7. The apparatus of claim 6, wherein the mechanism comprises a session descriptor comprising a session identifier (ID) attribute, a session ID URL attribute, and a session duration attribute, wherein the session ID attribute specifies a session identifier, wherein the session ID URL attribute specifies a URL from which will return a session ID in a format described by the session ID attribute, and wherein the session duration attribute specifies a time window between a time when the session identifier is received and when a new session identifier needs to be requested again.

8. The apparatus of claim 7, wherein the session descriptor further comprises a session release URL attribute and a session release parameter name attribute, wherein the session release URL attribute specifies a URL for notifying a server that the client is leaving the session, and wherein the session release parameter name attribute specifies a name of a query parameter carrying the session identifier.

9. The apparatus of claim 1, wherein the mechanism identifies an event, wherein the event is a method to signal time-related auxiliary information to the client or to an application.

10. The apparatus of claim 9, wherein the mechanism comprises an event descriptor with a scheme identifier (ID) URL attribute, an ID attribute, and a behavior attribute, wherein the scheme ID URL attribute specifies a URL to identify a scheme, wherein the ID attribute specifies an identifier for the event descriptor, and wherein the behavior attribute specifies whether or not support for a described event is required.

11. The apparatus of claim 1, wherein the mechanism comprises a generic descriptor with a name associated with a scheme and defined by the client.

12. The apparatus of claim 11, wherein the generic descriptor comprises a group identifier (ID) attribute and a behavior attribute specifying the generic descriptor's behavior.

13. The apparatus of claim 1, wherein the mechanism comprises a URL authentication descriptor comprising a key URL attribute, a key attribute, and a duration attribute, wherein the key URL attribute specifies a URL for key derivation, wherein the key attribute specifies a URL authentication key, and wherein the duration attribute specifies a duration of validity of the URL authentication key.

14. The apparatus of claim 13, wherein the URL authentication descriptor further comprises an algorithm attribute and a parameter name attribute, wherein the algorithm attribute specifies a signature algorithm uniform resource name (URN), and wherein the parameter name attribute specifies a name of a query parameter carrying a URL signature.

15. The apparatus of claim 1, wherein the apparatus is a server, and wherein the transmitter is further configured to further transmit the MPD to the client.

16. A client comprising:
a receiver configured to receive a Dynamic Adaptive Streaming over Hypertext Transfer Protocol (DASH) media presentation description (MPD), wherein the MPD comprises a mechanism for specifying the client's behavior and comprising at least one of an identifier (ID) attribute for a descriptor type descriptor, an essential property descriptor, and a supplemental property descriptor, wherein the ID attribute specifies an identifier for the descriptor, wherein descriptors with identical ID attributes are synonymous, wherein the essential property descriptor specifies information about a containing element that is considered essential by a media presentation author for processing the containing element, wherein the supplemental property descriptor specifies supplemental information about the containing element that may be used by the client optimizing a processing, and wherein the mechanism provides uniform resource locator (URL) authentication that restricts access to main content if the client is downloading ad content; and
a processor coupled to the receiver and configured to process the MPD.

17. The client of claim 16, wherein at least one of the ID attribute, the essential property descriptor, and the supplemental property descriptor is used to identify a session.

18. The client of claim 16, wherein at least one of the ID attribute, the essential property descriptor, and the supplemental property descriptor is used to define a type.

19. The client of claim 16, wherein at least one of the ID attribute, the essential property descriptor, and the supplemental property descriptor is used to identify an event.

20. A method comprising:
receiving a request for a Dynamic Adaptive Streaming over Hypertext Transfer Protocol (DASH) media presentation description (MPD);
creating the MPD, wherein the MPD comprises a mechanism for specifying a client's behavior, wherein the mechanism conditions the client's ability to download content on the client's ability to support a feature, and wherein the mechanism provides uniform resource locator (URL) authentication that restricts access to main content if the client is downloading ad content; and
transmitting the MPD.

* * * * *

UNITED STATES PATENT AND TRADEMARK OFFICE
CERTIFICATE OF CORRECTION

PATENT NO. : 10,270,829 B2
APPLICATION NO. : 15/381909
DATED : April 23, 2019
INVENTOR(S) : Alexander Giladi et al.

Page 1 of 1

It is certified that error appears in the above-identified patent and that said Letters Patent is hereby corrected as shown below:

On the Title Page

Page 2, item (56) Column 2, Line 11, should read:
2013/0268577 A1 10/2013 Oyman

Signed and Sealed this
Eighteenth Day of June, 2019

Andrei Iancu
*Director of the United States Patent and Trademark Office*